Aug. 13, 1935.   A. P. ROBINSON   2,011,301
VENTILATING MEANS FOR AUTOMOBILES
Filed Feb. 13, 1933   3 Sheets-Sheet 1
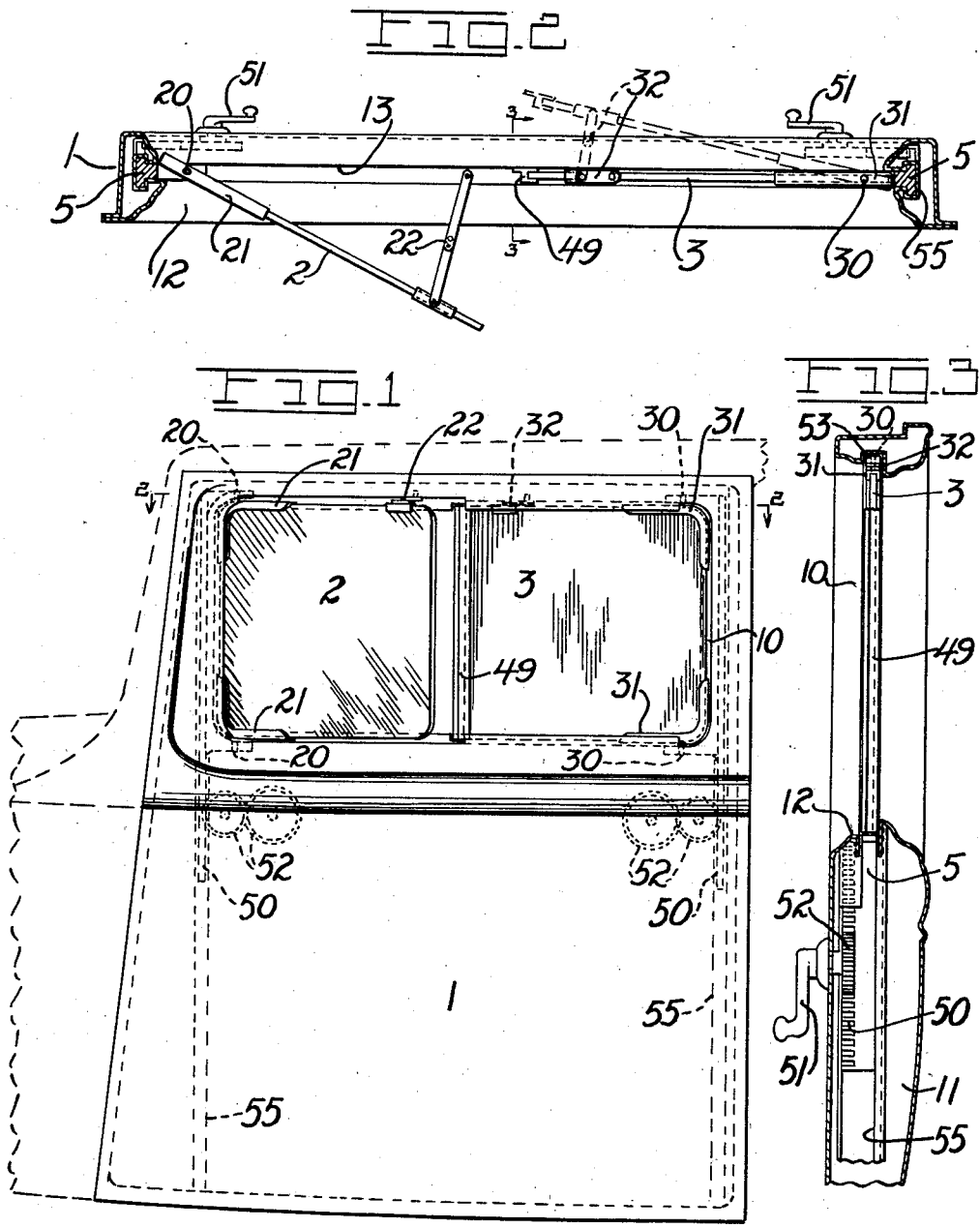
INVENTOR
Albert P. Robinson
BY
Charles L. Reynolds
ATTORNEY Aug. 13, 1935.　　　A. P. ROBINSON　　　2,011,301
VENTILATING MEANS FOR AUTOMOBILES
Filed Feb. 13, 1933　　　3 Sheets-Sheet 2
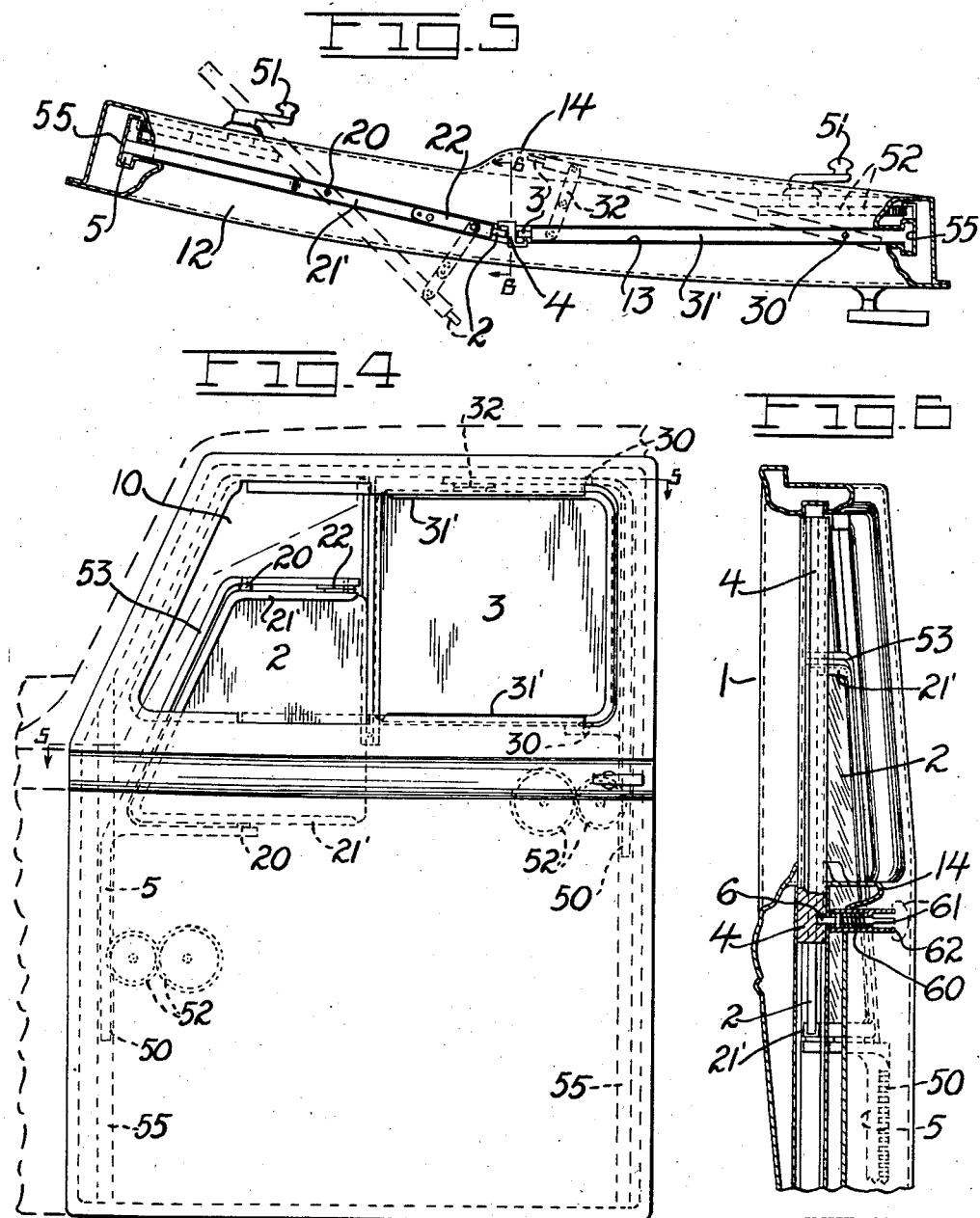
INVENTOR
Albert P. Robinson
BY
Charles L. Reynolds
ATTORNEY

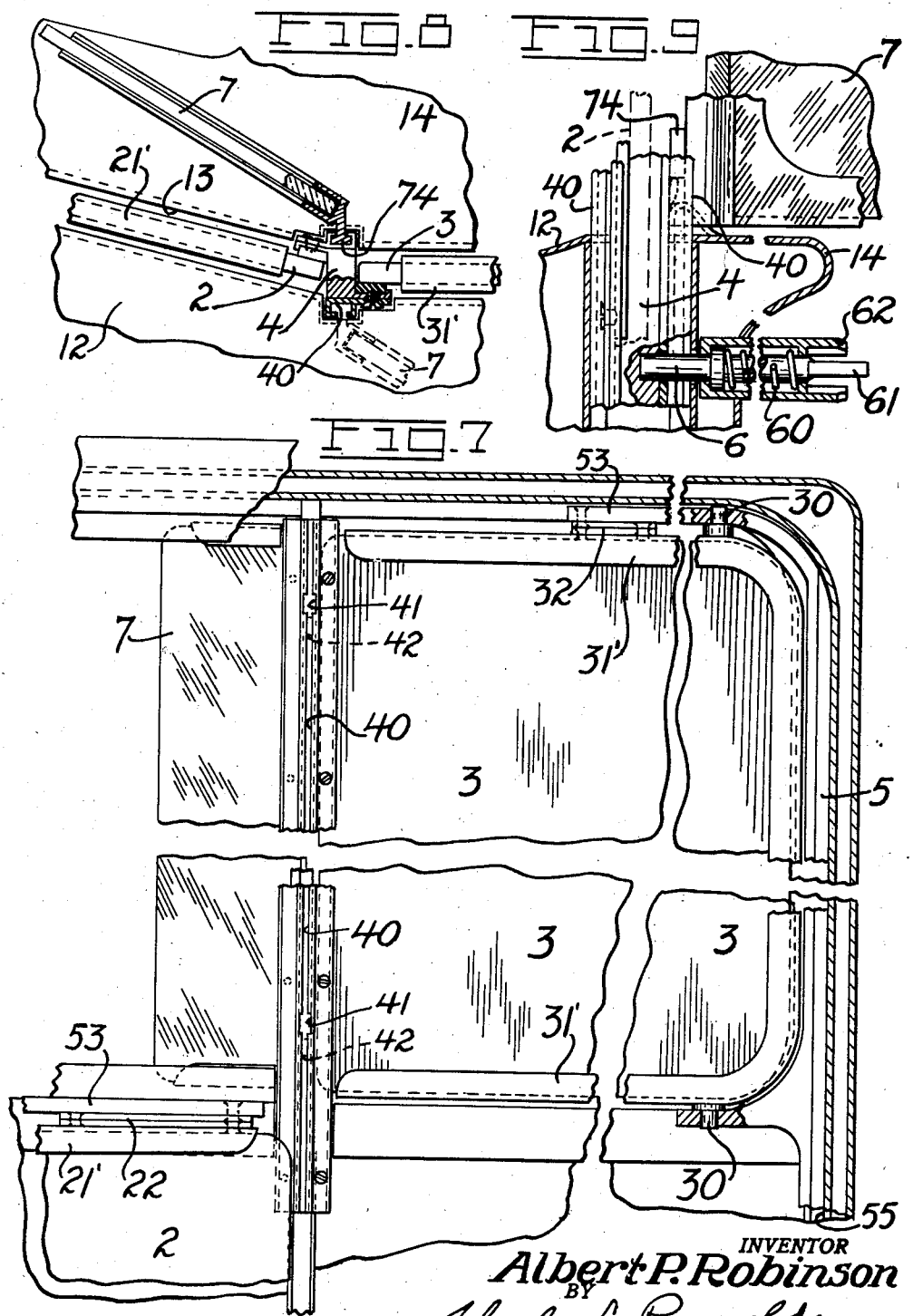

Patented Aug. 13, 1935

2,011,301

UNITED STATES PATENT OFFICE 2,011,301

VENTILATING MEANS FOR AUTOMOBILES

Albert P. Robinson, Seattle, Wash.

Application February 13, 1933, Serial No. 656,417

17 Claims. (Cl. 296—44)

My invention relates to the ventilation of vehicles, such as automobiles, and to the provision of glass closure means for window openings provided, usually in the doors of an automobile, whereby an opening may be left for ventilation, yet the occupants may be shielded from drafts entering through that opening, and whereby the positions of the closures may be independently controlled, as weather and driving conditions, and the necessity of signaling and obtaining good vision, may require.

My invention may take various forms, and would vary in accordance with the design and construction of the vehicle to which it is applied, but the principles thereof and the special objects attained thereby will be best understood from a study of the accompanying drawings, wherein my invention is shown in representative forms, and of this specification and the claims which terminate the same.

Figure 1 is an outside elevation of an automobile door having my invention incorporated therein in a simple form.

Figure 2 is a horizontal transverse section on the line 2—2 of Figure 1, and Figure 3 is a vertical transverse section on the line 3—3 of Figure 2, showing the same type of door.

Figure 4 is an elevation, similar to Figure 1, of a modified form, and Figures 5 and 6 are sections corresponding to Figures 2 and 3 on the respective lines 5—5 of Figure 4 and 6—6 of Figure 5.

Figure 7 is an enlarged elevation, with parts broken away, of the same form, with the addition of a deflector, Figure 8 is a plan view of the same, the soffit of the door being omitted, and Figure 9 is a detail transverse sectional view of the post-securing means.

While it has been proposed heretofore to form the glass closure of an automobile door in two sections, and to permit the forward section to swing outwardly to act as a deflector and to leave a ventilating opening between its rear edge and the forward edge of the rear section, such devices, as far as I am aware, have never been of such character that the entire window opening can be left open, that is to say, of such character that the forward section of the closure could be moved to a position below the level of the window sill. A forward section of this type, permanently fixed in position except as it may swing, is not disadvantageous in good weather, but every driver has experienced the annoyance due to interference with vision by raindrops, snow, fog, mud, and the like upon a window which is raised above the eye level, or upon a wind deflector located outside the normal window glass. The normal window glass can be dropped below eye level, in such circumstances, but a deflector cannot be removed readily from its position, nor can the swingable forward closure section first refered to. In bad weather, then, such a permanently positioned piece of glass is not only annoying, but may be positively dangerous because of the distortion of and interference with the vision of the driver, while the dropping of the window glass exposes the driver and all other occupants to severe drafts, rain, cold, etc.

At the same time it is advantageous to have a section which will swing outward to act as a deflector, and to leave a gap through which ventilating air may enter, especially if means be provided to prevent a strong draft of air entering through this gap and striking the person just inside. It is also advantageous to be able to drop the forward section for clearer vision, without dropping the rear section, or to drop the rear section for signaling without dropping the forward section, in each instance retaining the maximum of protection for the car's occupants.

My invention accomplishes the advantages of the former construction, yet avoids its disadvantages, by reason of the fact that though the forward closure may swing outward, or alternatively or complementally the rear closure may swing inward, the forward closure or section is not held permanently upraised, but may be lowered whenever safety, comfort or convenience of the driver or passenger makes that desirable. Furthermore, the two closures which cooperate to close the complete window opening are independently movable, both for vertical movement in the plane of the window opening and for swinging movement, so that the forward closure may be raised or lowered at will and without regard to the position of the rear closure, and similarly, the rear closure can be raised or lowered without regard to the position of the forward closure, and the forward closure can be swung outwardly at will, and the rear closure can be swung inwardly.

A simple form of the device is shown in Figures 1, 2 and 3. A typical automobile door 1 is illustrated, having the normal window opening 10 and a storage space 11 below the sill 12. Access to the storage space is had through the usual slot 13 in the sill.

The closure for the window opening 10 is formed of two or more complemental glass plates;

ordinarily only two would be used, and these are designated 2 and 3 to distinguish them. The closure 2 is the forward one, and the closure 3 the rearward one. These may divide the area of the window opening between them in any suitable ratio, consistent with the objects intended. As shown, each closes about one-half the opening. When both are in position to close the window opening, the rear edge of the forward closure 2 lies substantially in the plane of and closely adjacent the forward edge of the rear closure 3, and to maintain parts in this position, yet to prevent contact and rattling between the two, a cushion strip may be employed; for instance a strip of rubber, indicated at 49, may be employed. This can be applied to the edge of one closure, and have a flange contacting with an edge of the other closure.

Preferably these closures 2 and 3 are each pivotally mounted on a vertical axis, adjacent opposite edges of the window opening. Thus the forward closure 2 is pivotally mounted at 20 adjacent the forward edge of the window opening, and the rear closure 3 is pivotally mounted at 30 adjacent the rear edge of the window opening. For this purpose pivot pins project from frame members 21 and 31, respectively, these pivot pins being received in a slide 5 received in a slot or guide 55 in the edge of the window opening.

The same type of slide may be used for each of the closures, so that a description of one will suffice for the other. This slide may take any suitable form so that it is permanently retained in the edge of the window opening, and may move from a position where the closure supported thereby is in operative position, in registry with the window opening, to an inoperative position, wherein the closure lies below the level of the sill, ordinarily passing through the slot 13 and into the storage space 11. Any suitable means of accomplishing this vertical movement may be employed, and as shown herein, a handle 51 is provided inside the door to operate pinions, generally indicated at 52, the last of which is in mesh with a rack member 50 which is secured to or formed as part of the vertical slide 5. Two such control handles 51 would be employed, one for each of the closures, and by these means they are independently controlled for vertical movement.

The swinging movement of these closures may be accomplished by hand, once they have been raised into operative position. The sill, the soffit, and the edges of the window opening are so formed, as may be seen in Figure 3 for example, that the forward closure may not swing inwardly, but is permitted to swing outwardly, and a toggle arrangement 22, or any suitable means, limits the outward swing of the rear edge of this closure. Similarly, the rear closure 3 is preferably not permitted to swing outwardly, but is only permitted to swing inwardly, and a similar stop 32 limits inward swing of its forward edge. If, under conditions requiring intake of air for cooling, it were desired to swing the rear closure 3 outwardly to act as a scoop, this could be arranged, but ordinarily this is not desirable.

It will be plain that the driver can raise the forward closure 2 only, leaving the rear closure 3 within the storage space and below the sill, or may partly raise the latter. He may swing the forward closure 2 outwardly, making of it a deflector, yet in case the driver desires clearer vision the closure member 2 may be swung inward and dropped to a level where it will not interfere with vision, yet the rear closure 3 may be fully raised at such time to keep off direct drafts that would otherwise blow in upon the driver. If the driver wishes, he may have the forward closure 2 completely raised and swung outward to leave a gap between its rear edge and the forward edge of the rear closure 3, and if this ventilating opening or gap is not sufficient, with the rear closure in its operative position in the general vertical plane of the slot 13, this rear closure may be swung inward, as shown in dotted lines in Figure 2, to increase the gap between the two closures. At times it may be desired to leave the forward closure 2 within the storage space, or only partly raised therefrom, yet in order to better protect the driver the rear closure 3 may be swung inwardly to provide an angularly disposed deflecting surface which, instead of projecting outwardly from the car, projects slightly inward, yet not sufficiently to interfere with the driver; because of its angular position relative to the direction of forward motion it serves as an efficient deflector when so positioned.

The same principles may be incorporated in various forms, and in various designs of car and door. Thus in Figures 4, 5 and 6 there has been illustrated a door with a considerably inclined forward edge, which does not lend itself readily to vertical movement of the forward closure 2, or at least does not facilitate a swinging movement along the line of the forward edge of the window opening. In this instance the door is shown as curved, viewed in plan, and the closures 2 and 3 and the slot 13 are angled; that is to say, the closures do not lie in a common plane when in operative position in the window opening.

The slide 5 is disposed, as before, in a vertical guideway 55 in the lower part of the door, but at its upper end terminates in a bracket 53 which is inclined to fit the inclined forward edge of the window opening, and the pivots 20 are received in the lateral arms of this bracket. The extension or stop links 22 are likewise engaged with an arm of this bracket 53, and the closures are shown with frames 21' and 31', respectively, extending about three sides to strengthen and support the glass.

Instead of a rubber cushion strip between and secured to one of the meeting edges of the closures 2 and 3, I may provide a post 4 which is retained in position to engage and guide the adjacent edges of the two closures, as they move upward into the window opening. The flanges of this post are so formed that the post assumes a Z-shape, thereby permitting the forward closure to swing outward, and the rear closure to swing inward only. Contact of the glass with the post 4 is suitably cushioned.

As may be seen in Figure 5, the inward swinging of the rear closure 3 is limited by the stop means 32, and the sill 12 is extended inward somewhat, as indicated at 14, whereby to protect the inwardly swung edge of the closure 3, and to serve, when the closure is not swung inward, as an arm rest for the driver or occupant of the adjacent seat.

While the post 4 might be permanently positioned within the opening, it is preferred that it be removable, so that the entire window opening may be unobstructed in good weather. To this end I may provide a spring-held pin 6, shown in detail in Figure 9, supported immediately beneath the sill and projectable into a socket in the lower end of the post 4. The pin, however, may be withdrawn in opposition to its spring 60, and the head 61 of the bolt may be engaged upon the end of the guide sleeve at 62, thereby to hold the bolt retracted, and to permit release and removal of the post.

At times it may be desirable to drive with the forward closure 2 in a lowered position, partly or wholly beneath the level of the sill, since this position will give the clearest vision quartering ahead. However, this is usually during periods of stormy weather, when the closure 2, if upraised, would be spotted with fog, rain, snow, or mud. It is therefore necessary that the driver or other occupant of a seat adjacent this window be protected from drafts blowing in. It may also be desirable to drop the rear closure 3, and to leave the forward closure 2 open, to permit more ready signaling; yet here again it is necessary to protect the occupant of the adjacent seat from drafts, perhaps to a greater extent than is afforded by the closure which remains upraised.

To this end I may employ a deflector such as is shown at 7 in Figures 7 and 8. This need not be of any considerable width, but should be of a height substantially equal to that of the window opening. Preferably it is removably supported upon the post 4, and to this end the post may have T-shaped channels 40 upon its inner and outer faces, within which is received a similarly formed head 74 upon the inner edge of the deflector 7. The flanges of the channel may be relieved as indicated at 41 to receive the heads 74, which when dropped within the channel are supported as for example upon a ledge 42, whereby the deflector is rigidly secured and held in position, inclined somewhat with respect to the plane of the adjacent closure. As may be seen in Figure 8, it may be supported either to project forwardly, inclined somewhat forward and inward upon the inside of the door, or it may be inclined somewhat rearward and outward upon the outside of the door.

What I claim as my invention is:

1. In combination with an automobile door or the like having a window opening, a plurality of glass closures movable independently from an inoperative position, wherein they are below the level of the sill, to an operative position in registry with the window opening, and cooperatively closing the same, and said closures being mounted for lateral movement of an edge of one relative to the adjacent edge of another, thereby to leave a rearwardly facing ventilating opening, and deflecting means disposed at such opening to deflect rearwardly moving air away from the automobile interior.

2. In combination with an automobile door or the like having a window opening, a plurality of partial closures each movable independently from an inoperative position, wherein it is below the level of the sill, to an operative position in registry with the window opening, and in cooperation with the other closures closing the same, and means supporting the rear closure to swing its forward edge inward from such operative position.

3. In combination with an automobile door or the like having a window opening, a front and a rear glass closure each movable independently from an inoperative position, wherein it is below the level of the sill, to an operative position in registry with the window opening, and in cooperation with the other closure closing the same, means supporting the rear closure to swing its forward edge inward from such operative position, to leave an opening between such edge and the rear edge of the forward closure and means supporting the forward closure to swing its rear edge outward from such operative position.

4. In combination with an automobile door or the like having a window opening, a front and a rear glass closure each movable independently from an inoperative position, wherein it is below the level of the sill, to an operative position in registry with the window opening, and in cooperation with the other closure closing the same, means supporting the rear closure to swing its forward edge inward from such operative position, to leave an opening between such edge and the rear edge of the forward closure, and a deflector disposed at the rear edge of the forward closure and extending thence rearwardly to deflect rearwardly moving air from such opening.

5. In combination with an automobile door or the like having a window opening, a front and a rear glass closure each movable independently from an inoperative position, wherein it is below the level of the sill, to an operative position in registry with the window opening, and in cooperation with the other closure closing the same, means supporting the rear closure to swing its forward edge inward from such operative position, to leave an opening between such edge and the rear edge of the forward closure, a deflector disposed at the rear edge of the forward closure and extending thence rearwardly to deflect rearwardly moving air from such opening, and means supporting said deflector in such position and permitting removal therefrom.

6. In combination with an automobile door or the like having a window opening, a front and a rear glass closure each movable independently from an inoperative position, wherein it is below the level of the sill, to an operative position in registry with the window opening, and closing the same in cooperation with the companion closure, means supporting the forward closure to swing its rear edge outward from such operative position, to leave an opening between such edge and the forward edge of the rear closure, and a deflector disposed at the forward edge of the rear closure and extending thence forwardly to bar admittance of air passing inward around the rear edge of the forward closure.

7. In combination with an automobile door or the like having a window opening, a plurality of glass closures adapted to cooperatively close such window opening, including a rear closure, means pivotally supporting such rear closure to swing its forward edge inwardly from the rear edge of the adjacent closure, means to limit inward swing thereof, and the window sill extending inward to lie within a vertical projection of the rear closure in its innermost position.

8. In combination with an automobile door or the like having a window opening, a plurality of glass closures cooperatively closing the same, and mounted for lateral movement of an upright edge of one relative to the adjacent edge of another, to leave a rearwardly facing ventilating opening, and deflecting means disposed at such ventilating opening to deflect rearwardly moving air away from the automobile interior.

9. In combination with an automobile door or the like having a window opening, a plurality of glass closures cooperatively closing the same, and mounted for lateral movement of an upright edge of one relative to the adjacent edge of another, to leave a rearwardly facing ventilating opening, a post disposed in the window opening between the adjacent edges of such relatively movable closures, a deflector, and means upon said post for supporting said deflector in position to deflect rearward moving air away from the automobile interior.

10. In combination with an automobile door or the like having a window opening, a plurality of glass closures cooperatively closing the same, and mounted for lateral movement of an upright edge of one relative to the adjacent edge of another, to leave a rearwardly facing ventilating opening, a post disposed in the window opening between the adjacent edges of such relatively movable closures, a deflector, means upon said post for supporting said deflector in position to deflect rearwardly moving air away from the automobile interior, and means for removably securing said post in the window opening.

11. In combination with an automobile door or the like having a window opening, a plurality of glass closures cooperatively closing the same, and mounted for lateral movement of an upright edge of one relative to the adjacent edge of another, to leave a rearwardly facing ventilating opening, a post disposed in the window opening between the adjacent edges of such relatively movable closures, a deflector, means upon the post to removably support said deflector in position extending inwardly and forwardly from the post, and like means upon the post to removably support the deflector alternatively in position extending outwardly and rearwardly from the post.

12. In combination with an automobile door or the like having a window opening, a front and a rear glass closure each movable from an inoperative position, wherein it is below the level of the sill, to an operative position in registry with the window opening, and in cooperation with the other closure closing such window opening, independent means for so moving each of said closures, and a deflector disposed at the junction of the adjacent edges of said closures, in position to deflect outwardly the rearwardly moving air tending to enter any portion of the window opening left unclosed by a closure not fully in operative position.

13. In combination with an automobile door or the like having a window opening, a front and a rear glass closure each movable from an inoperative position, wherein it is below the level of the sill, to an operative position in registry with the window opening, and in cooperation with the other closure closing such window opening, independent means for so moving each of said closures, a deflector, a post disposed between the adjacent edges of said closures, and means engageable between said post and said deflector to support the latter inclined outwardly and rearwardly from the post, or alternatively inclined inwardly and forwardly from the post.

14. In combination with an automobile door or the like having a window opening, a front and a rear glass closure, the rear closure being movable from an inoperative position, wherein it is below the level of the sill, to an operative position wherein it is in registry with the window opening, and in cooperation with the front closure closes such window opening, means for so moving said rear closure, and a deflector disposed in an upright plane at an edge of that portion of the window opening which is intended to be closed by said rear closure, and inclined laterally relative to the direction of forward movement, to deflect rearwardly air tending to enter such portion of the window opening when the rear closure is not in operative position.

15. In combination with an automobile door or the like having a window opening, a front and a rear glass closure adapted to lie in registry with the window opening and to cooperatively close such window opening, means pivotally supporting said rear closure to swing its forward edge inwardly from the rear edge of the adjacent closure, to leave a rearwardly facing opening therebetween, and means operable while the rear closure is in registry with the window opening, or in its inwardly swung position, for moving said front closure vertically to remove it from registry with the window opening, or to return it into such registry, at will.

16. In combination with an automobile door or the like having a window opening, a front and a rear glass closure adapted to lie in registry with the window opening and to cooperatively close such window opening, means pivotally supporting said rear closure to swing its forward edge inwardly from the rear edge of the adjacent closure, to leave a rearwardly facing opening therebetween, and means operable while the front closure is in registry with the window opening, for moving said rear closure vertically to remove it from registry with the window opening, or to return it into such registry, at will.

17. In combination with an automobile door or the like having a window opening, a closure means extending from the rear edge of said window opening forwardly, means supporting said closure means in position wherein its forward edge is disposed inwardly of the window opening, the window sill extending inward to lie within a vertical projection of, and adjacent to the lower edge of, said closure means in such position.

ALBERT P. ROBINSON.